Dec. 20, 1966
J. H. EAGLE ETAL
3,292,517
EXPOSURE CONTROL SYSTEMS FOR CAMERAS
Filed April 13, 1966
2 Sheets-Sheet 1
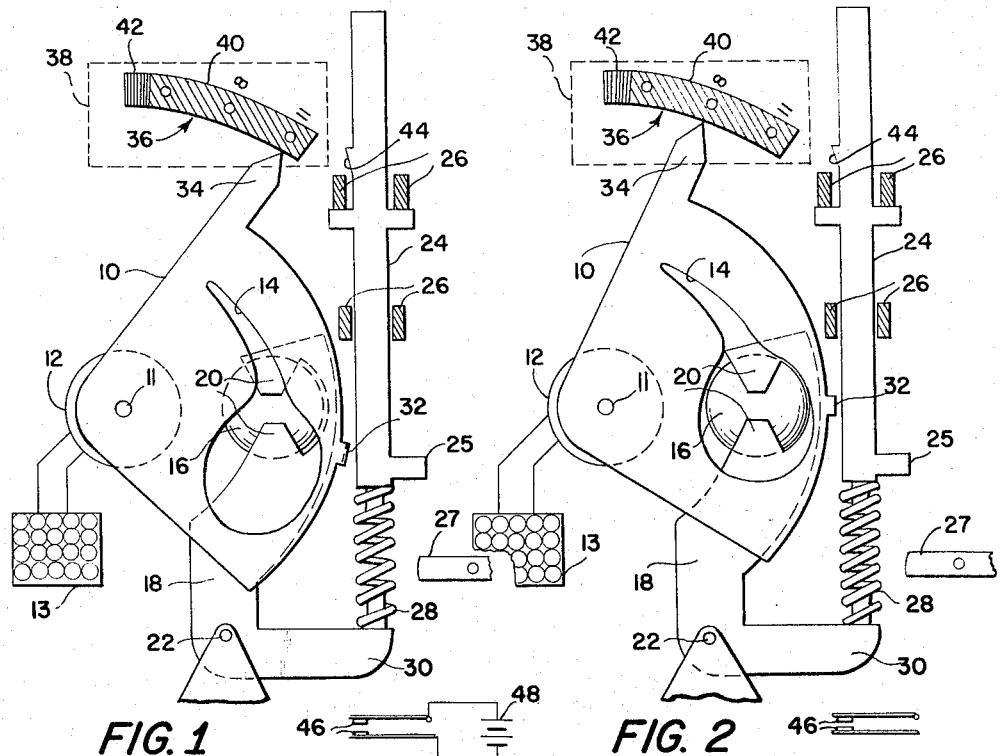
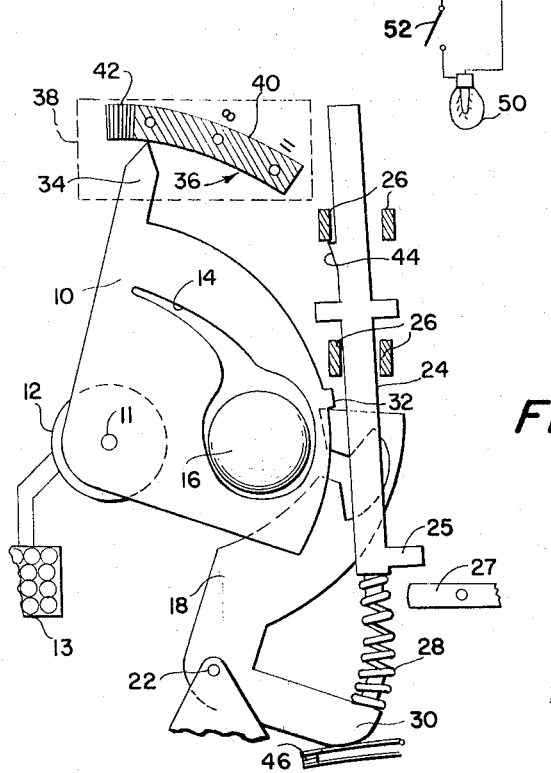
INVENTORS
JOHN H. EAGLE
DONALD M. HARVEY
BY
ATTORNEY Dec. 20, 1966  J. H. EAGLE ETAL  3,292,517
EXPOSURE CONTROL SYSTEMS FOR CAMERAS
Filed April 13, 1966  2 Sheets-Sheet 2

INVENTORS
JOHN H. EAGLE
DONALD M. HARVEY

BY

ATTORNEY

United States Patent Office 3,292,517
Patented Dec. 20, 1966

3,292,517
EXPOSURE CONTROL SYSTEMS FOR CAMERAS
John H. Eagle and Donald M. Harvey, Rochester, N.Y., assignors to Eastman Kodak Company, Rochester, N.Y., a corporation of New Jersey
Filed Apr. 13, 1966, Ser. No. 542,373
10 Claims. (Cl. 95—64)

The present invention, which is a continuation-in-part of earlier co-pending application Serial No. 310,415, filed Sept. 20, 1963, now abandoned, relates to photoelectric exposure control systems for cameras, and more particularly concerns an improvement of the masked single-vane type of exposure control system.

In exposure control systems for cameras it is well known to use a normally fixed mask in cooperation with a single movable diaphragm vane for substantially centralizing the exposure aperture at most diaphragm settings. Although the masked single-vane system is perhaps the most efficient and inexpensive exposure control structure yet devised, its mask covers part of the full lens aperture and therefore reduces the maximum usable aperture somewhat, typically one-third to one-half stop.

In order to use the full aperture at conditions of lowest scene brightness it has been suggested that the mask be manually removable from alignment with the taking lens, for example as illustrated in FIG. 1 of U.S. Patent 3,033,093, although this requires the camera operator to remember to remove the mask for full aperture. In another suggested alternative, the movable vane engages the mask at low scene brightness and automatically removes it from alignment with the taking lens for maximum aperture, as disclosed in FIGS. 15 and 16 of the above-mentioned patent. However, this automatic system imposes an additional load on the exposure meter, which derogates somewhat from the basic advantage of the masked single-vane system.

The invention herein provides a movable mask which is yieldably driven towards a position out of alignment with the taking lens by each actuation of the camera's shutter release mechanism. However, structure interrelating the meter-driven vane and the mask normally holds the mask in alignment with the taking lens, permitting the mask to move out of such alignment to provide maximum lens aperture only when the vane is positioned in response to low scene brightness. Movement of the mask out of alignment with lens also enables a normally disabled flash circuit. This same structure is equally effective in both still and movie cameras. When used in a movie camera, the structure cooperates with the shutter mechanism to provide a further function namely, to lock the meter-driven vane against movement during each of the successive periods when the camera shutter is open, while allowing the vane to re-adjust to variations in scene brightness during each of the successive periods when the shutter is closed.

It is therefore a primary object of the present invention to automatically remove such a mask from alignment with the taking lens at conditions of low scene brightness, but without imposing any additional load on the exposure meter. A more specific object is to remove the mask under manual power at conditions of low scene brightness, but without requiring the operator's knowledge of such removal or any deliberate act on his part specifically to effect such removal.

A further object of the invention is to enable a normally disabled flash circuit only under conditions of low scene brightness, in conjunction with automatically removing the mask of a masked single-vane exposure control system from alignment with the taking lens.

Another object of the invention is to provide a masked single-vane exposure control system for movie cameras which can automatically re-adjust between exposures to varying conditions of scene illumination.

Other objects of the invention will appear from the following description, reference being made to the accompanying drawings, wherein:

FIGS. 1 and 2 are front views of the invention showing the relative positions of the diaphragm vane and mask at scene brightness corresponding to less than full lens aperture;

FIG. 3 is a view similar to FIGS. 1 and 2 illustrating the relative positions of the diaphragm vane and mask at low scene brightness.

Figure 5:
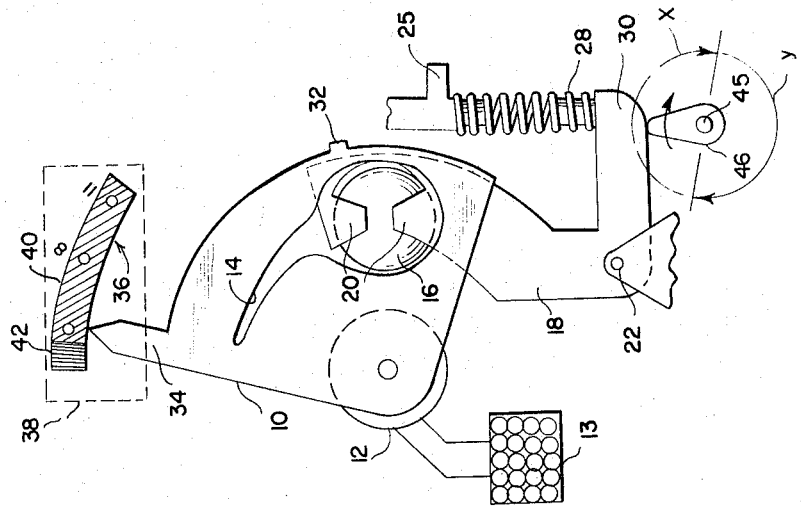
FIGS. 4 and 5 are front views of a slightly modified version of the embodiment of FIGS. 1–3 as adapted for use in a motion picture camera.

Referring to the drawings, a single diaphragm vane 10 is mounted at 11 on an exposure meter measuring instrument 12, which is energized by a photocell 13 in a manner well known in the art for pivoting the vane as a function of cell illumination, e.g., scene brightness. Vance 10 has an elongated, tapered aperture 14 which, upon pivotal movement of the vane, is variably aligned with a camera taking lens 16. A bell crank 18 carries a pair of masking members 20 normally overlying peripheral portions of the lens and cooperating with vane aperture 14 to form an exposure aperture. Bell crank 18 is pivoted at 22 for angular movement in a manner hereinafter described.

A camera actuating member 24 is loosely guided by frame members 26 for vertical movement and is adapted to be depressed manually against the action of a compression spring 28, which bears against an arm 30 of bell crank 18. Upon manual depression of actuating member 24 the compression of spring 28 tends to rock bell crank 18 clockwise about its pivot 22, but this movement normally is prevented by engagement of the bell crank with an ear 32 on the diaphragm vane. Ear 32 is aligned with the surface of bell crank 18, preventing its clockwise movement throughout that range of positions of vane 10 corresponding to less than full diaphragm aperture. Two such positions of the diaphragm vane 10 are illustrated in FIGS. 1 and 2, wherein a pointer 34 on the vane is shown cooperating with the diaphragm scale 36, which may be divided into a green segment 40 (indicating normal lighting conditions) and a red segment 42 (indicating low-light conditions). Pointer 34 and scale 36 may be framed in the camera viewfinder, illustrated at 38.

When the diaphragm vane 10 is pivoted to a position requiring maximum aperture, e.g., its position shown in FIG. 3, or any position counter-clockwise thereof, ear 32 is moved to a position out of alignment with bell crank 18, thereby permitting the bell crank to be rocked clockwise upon depression of actuating member 24. This removes masking members 20 away from alignment with lens 16, automatically opening the lens to its full aperture without specific attention on the part of the camera operator and without increasing the load on the exposure meter instrument 12.

A latch 44 may be provided in cooperation with one of the frame members 26 for latching the camera actuating member in an intermediate position where the compression of spring 28 urges bell crank 18 clockwise, against ear 32 of the diaphragm vane, thereby locking the diaphragm vane in the position it occupies at the time. This is particularly useful in moving close to a photographic subject, latching the diaphragm vane in its position at that time, then moving back away from the subject to a desired distance and fully depressing the camera actuating member for taking a picture. Full depression of actuating member 24 causes an ear 25 thereon to operate a shutter actuating member 27 in a manner well known in the art.

The invention also may be used to enable a normally disabled flash circuit only in response to low-light conditions. For this purpose, FIGS. 1–3 show an arm 30 of bell crank 18 overlying a pair of normally open contacts 46, which are in electrical circuit with a battery 48, a flash lamp 50 and a pair of normally open shutter-synchronized contacts 52. When bell crank 18 rocks clockwise in response to depression of camera actuating member 24 under low-light conditions, it closes contacts 46, thus permitting the flash lamp to be energized when the shutter-synchronized contacts 52 are closed, in a manner well known in the art, upon actuation of the shutter.

Figure 4:
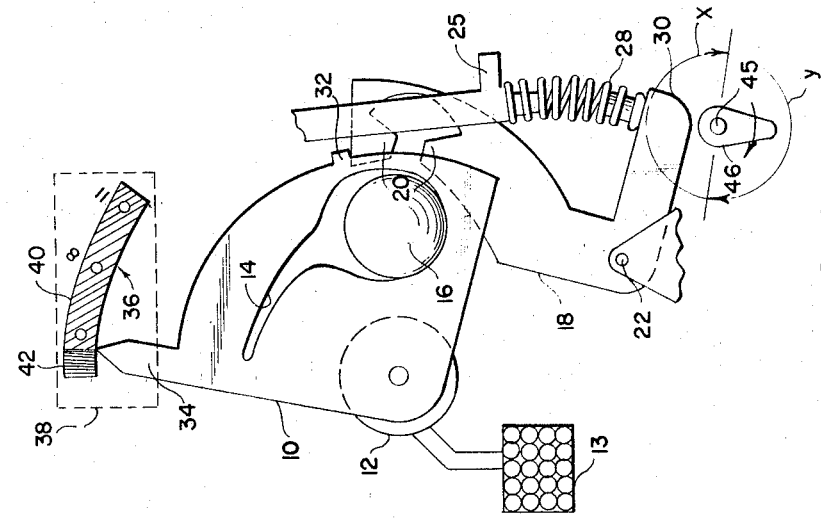

FIGS. 4 and 5 represent an adaptation of the embodiment of FIGS. 1–3 for use in a motion picture camera in which the shutter rotates one revolution per frame, the light being sealed off from the film during a sizeable portion of this rotation. In FIGS. 4 and 5, the shutter shaft, or a shaft rotating at the same surface speed as the shutter shaft, is represented as shaft 45 and has attached thereto a cam 46. The angle X represents the path of movement of cam 46 during which the shutter is closed, while angle Y represents the path during which the shutter is open.

The interrelation of vane 10 and mask-supporting bell crank 18, in response to the depression of shutter release member 25, is the same for this embodiment as was explained above in reference to FIGS. 1–3, namely, the mask is held in, or moved out of, alignment with taking lens 16 in accordance with the position of vane 10 and its ear 32.

FIG. 4 assumes that camera operation has been initiated under low-light conditions and, as indicated by the position of cam 46, the shutter is open. Bell crank 18 has moved the mask out of alignment with taking lens 16, and, so long as the shutter is opened, bell crank 18 interacts with ear 32 to prevent vane 10 from moving away from its maximum aperture position.

However, upon closing of the shutter and concurrent rotation of shaft 45 through the angle X, arm 30 of bell crank 18 is driven by cam 46 (in opposition to the force of compression spring 28) to its lens-masking position as shown in FIG. 5. This moves bell crank 18 out of contact with ear 32 and permits vane 10 to move to a new position in response to any change in scene illumination.

Just prior to the next successive opening of the shutter, further rotation of shaft 45 causes cam 46 to move out of contact with arm 30, and bell crank 18 is again urged clockwise under the force of spring 28, once again cooperating with ear 32 to hold vane 10 from further movement during exposure. It should be noted that when scene brightness is such that less than maximum lens aperture is desired (as in FIGS. 1, 2, and 5), bell crank 18 is held in its masking position by ear 32 during open shutter periods, and the force of spring 28 acting through these elements locks vane 10 in position.

Thus, the meter-driven vane is locked during film exposure, while remaining free to rotate at all other times, and the mask is automatically moved into and out of alignment with the lens to obtain the desired efficient lens aperture without imposing any additional load on the meter.

The invention has been described in detail with particular reference to preferred embodiments thereof, but it will be understood that variations and modifications can be effected within the spirit and scope of the invention as described hereinabove and as defined in the appended claims.

We claim:

1. In a camera having a manually operable shutter actuating member, a taking lens, and a photoelectric exposure control system including a photocell illuminatable by scene light, an electric measuring instrument energizable as a function of illumination of said photocell, a diaphragm vane with an elongated, tapered aperture, said vane being movable by said instrument in accordance with energization of the latter to variably position said vane aperture relative to and in alignment with said lens, and a mask having a normal position in alignment with said taking lens and cooperating with said vane aperture to form an exposure aperture, the improvement comprising:
   a movable support member carrying said mask and having a first position wherein said mask is maintained in its normal position in alignment with said lens, said support member also having a second position wherein said mask is out of alignment with said lens;
   yieldable means interrelating said actuating member and said support member and yieldably urging the latter toward its second position in response to operation of said actuating member; and
   means coupled to said vane for maintaining said support member in its first position when said vane occupies a position corresponding to a scene brightness of more than a predetermined value and permitting said support member to be moved to its second position, upon operation of said actuating member, when said vane occupies a position corresponding to scene brightness of less than said predetermined value.

2. The improvement defined in claim 1, wherein said actuating member comprises a linerally movable element, said support member comprises a pivotally movable bell crank, and said yieldable means comprises a compression spring.

3. The improvement defined in claim 1, with a flash circuit including: a normally open pair of electrical contacts cooperating with said support member and closed thereby when said support member is moved toward its second position.

4. The improvement defined in claim 1 wherein said shutter is moved through successive open and closed periods in response to the operation of said actuating member and further comprising: shutter repsonsive means for moving said support means to said first position during each successive period of said shutter.

5. The improvement defined in claim 4 wherein said shutter responsive means is a rotatable cam which drivingly engages said support means to move it against the urging force of said yieldable means during each successive closed-shutter period.

6. In a camera having a manually operable shutter actuating member, a taking lens, and an exposure control system including a diaphragm vane with an elongated, tapered aperture, said vane being movable to variably position its aperture relative to and in alignment with said lens, and a mask having a normal position in alignment with said lens and cooperating with said vane aperture to form an exposure aperture, the improvement comprising:
   a movable support member carrying said mask and having a first position wherein said mask is maintained in its normal position in alignment with said lens, said support member also having a second position wherein said mask is out of alignment with said lens;
   yieldable means interrelating said actuating member and said support member and yieldably urging the latter toward its second position in response to operation of said actuating member; and
   blocking means coupled to said vane for maintaining said support member in its first position when said vane occupies any position within a first predetermined range and permitting said support member to be moved to its second position, upon operation of said actuating member, when said vane occupies any position within a second predetermined range.

7. The improvement defined in claim 6, with a flash circuit including: a normally open pair of electrical contacts; and means controlled by said mask support member for closing said contacts when said support member is moved toward its second position.

8. The improvement defined in claim 6, with means for latching said actuating member in an intermediate position wherein said yieldable means maintains said blocking means in blocking relation with said support member to hold said vane in whatever position it then occupies.

9. The improvement defined in claim 6, wherein said shutter is moved continuously through successive open and closed periods in response to the operation of said actuating member and wherein said yieldable means maintains said blocking means in blocking relation with said support member during each successive open-shutter period to hold said vane in whatever position it then occupies.

10. The improvement defined in claim 9 further comprising shutter responsive means for releasing the blocking relation of said blocking means and said support member during each successive closed-shutter period, whereby said vane is movable to variably position its aperture relative to the lens so long as the shutter is closed.

No references cited.

NORTON ANSHER, *Primary Examiner.*